S. PALMOWSKI.
PACKING AND BOXING MACHINE.
APPLICATION FILED FEB. 14, 1920.

1,360,573.

Patented Nov. 30, 1920.

14 SHEETS—SHEET 2.

Fig. 2.

WITNESSES:

INVENTOR
Stanislaus Palmowski
BY
Thompson & Hill
ATTORNEY

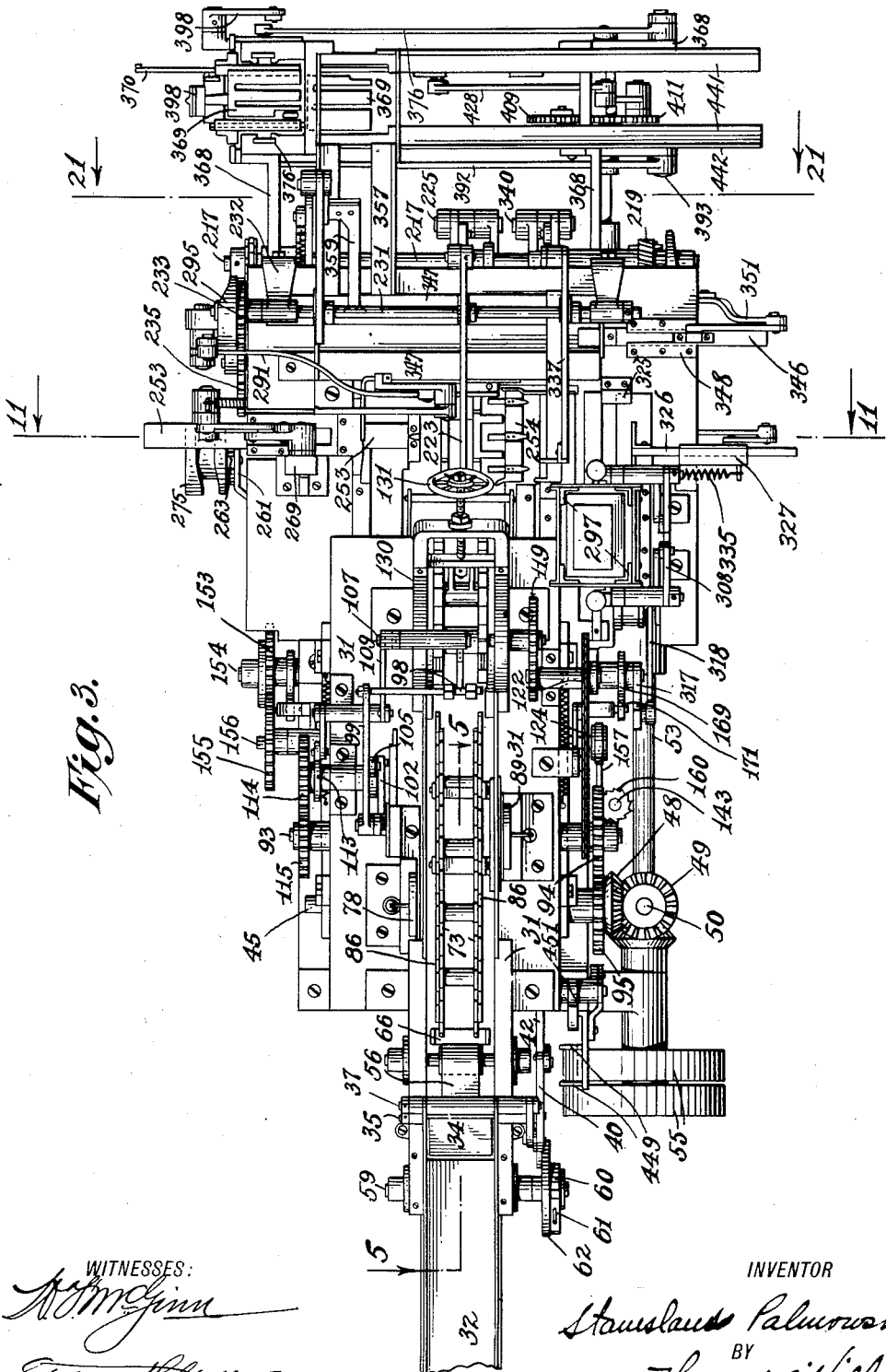

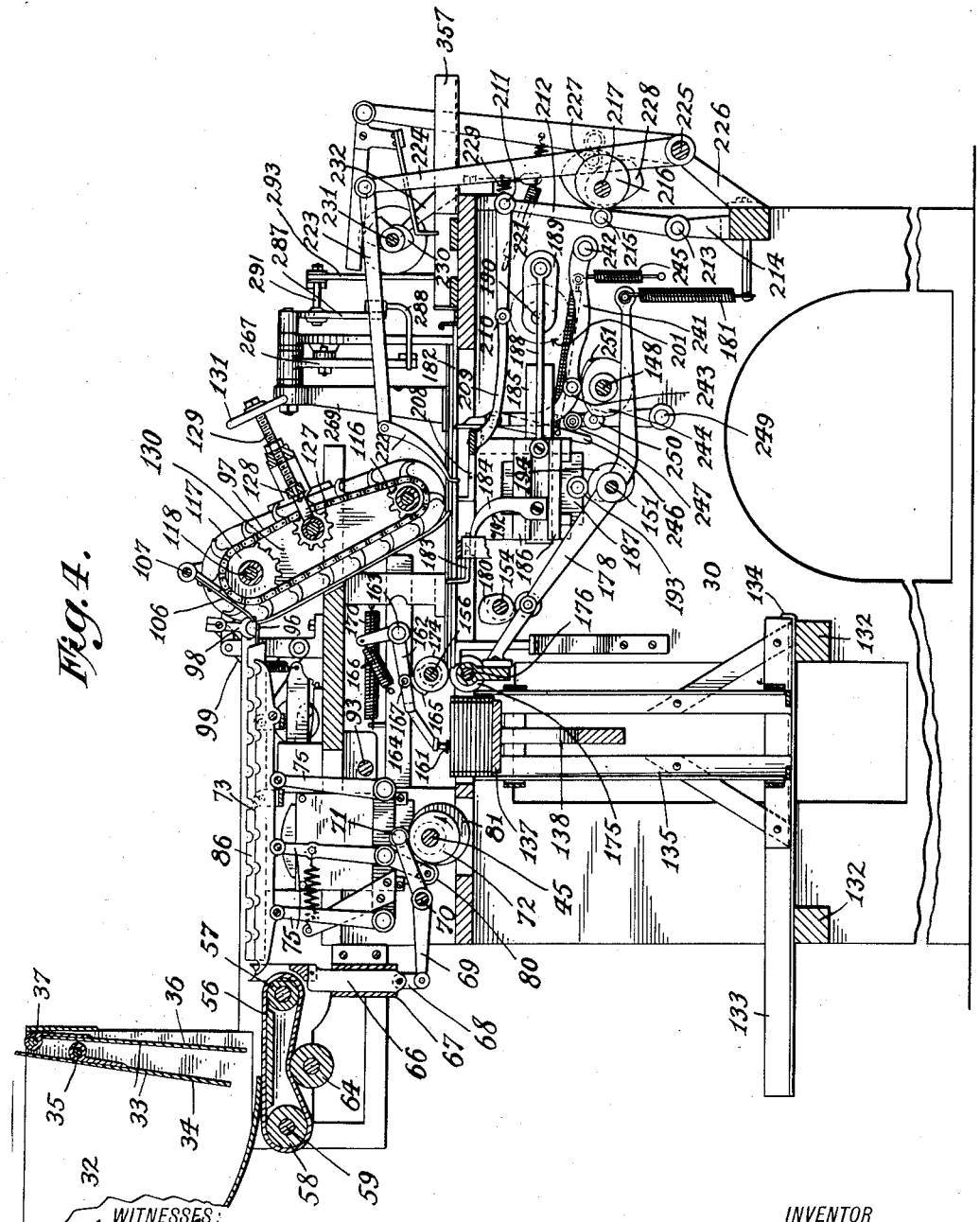

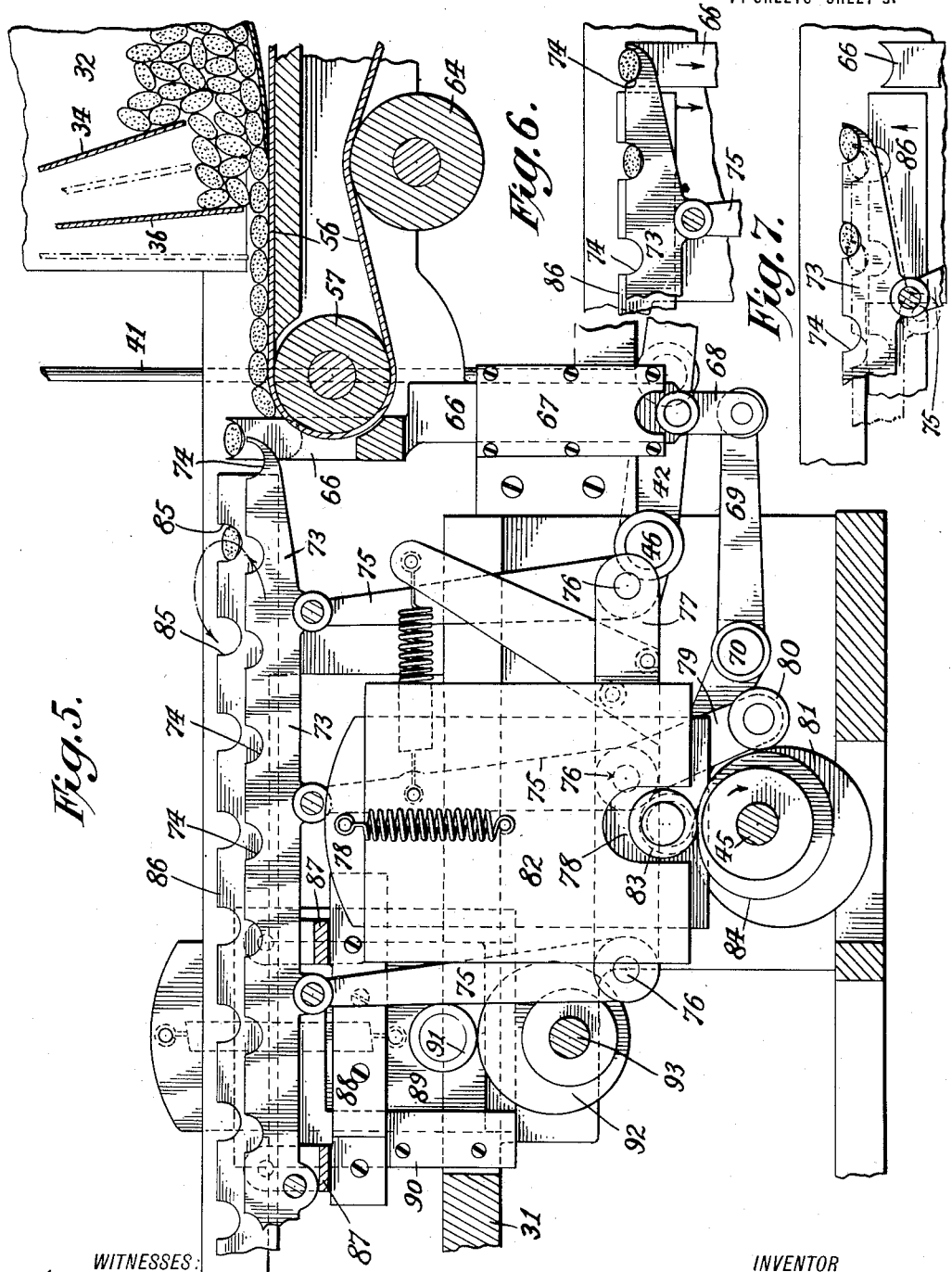

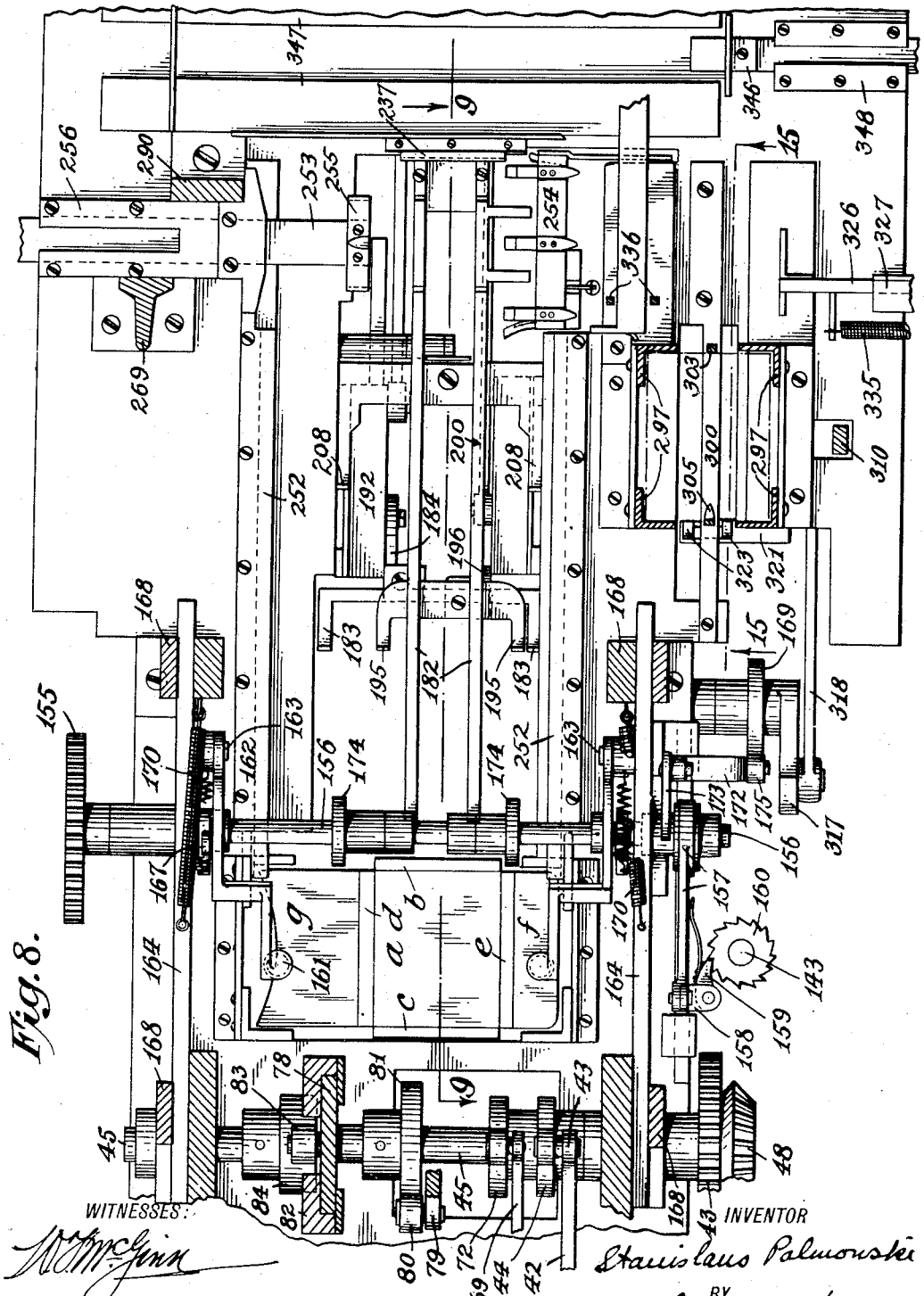

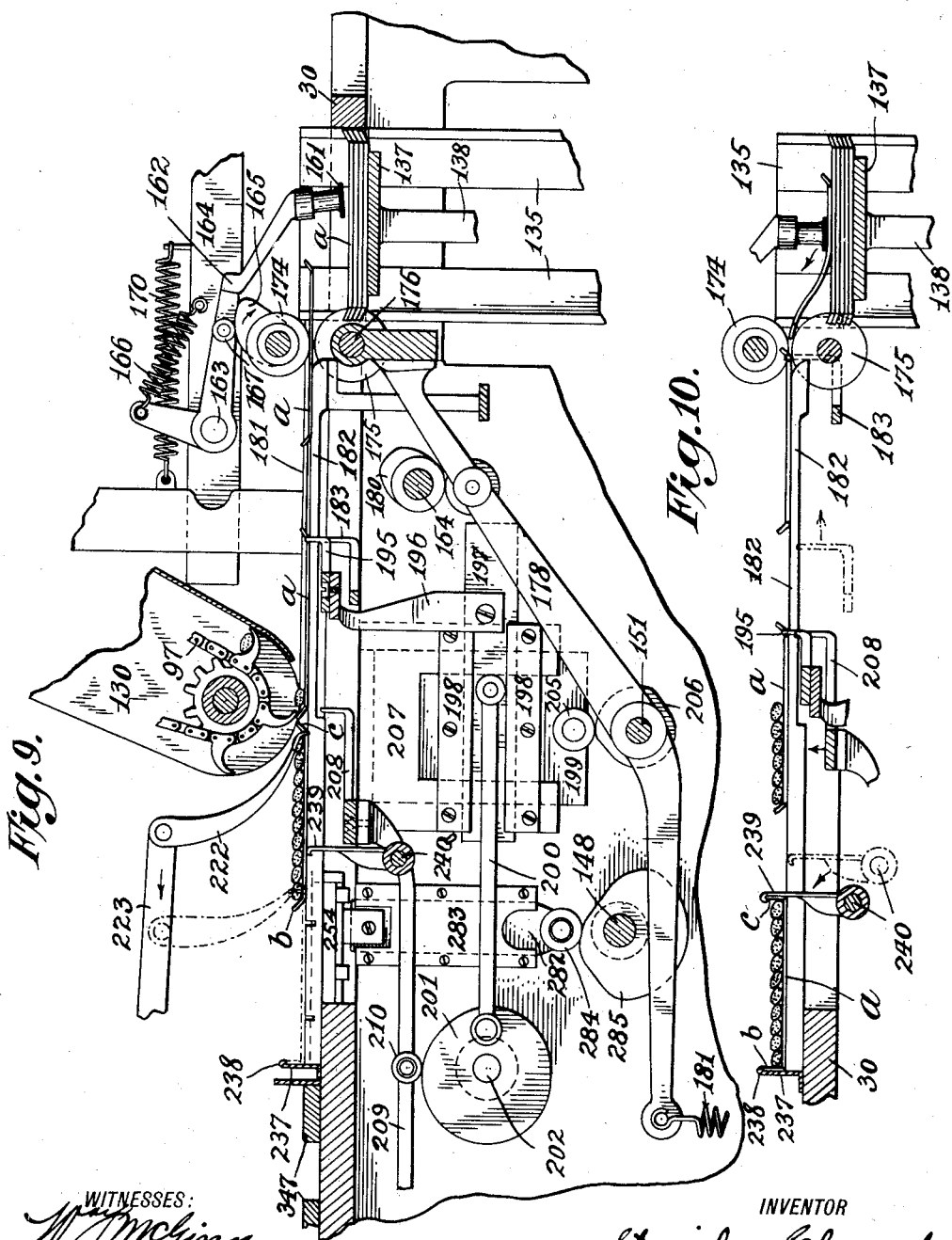

S. PALMOWSKI.
PACKING AND BOXING MACHINE.
APPLICATION FILED FEB. 14, 1920.
1,360,573.
Patented Nov. 30, 1920.
14 SHEETS—SHEET 8.
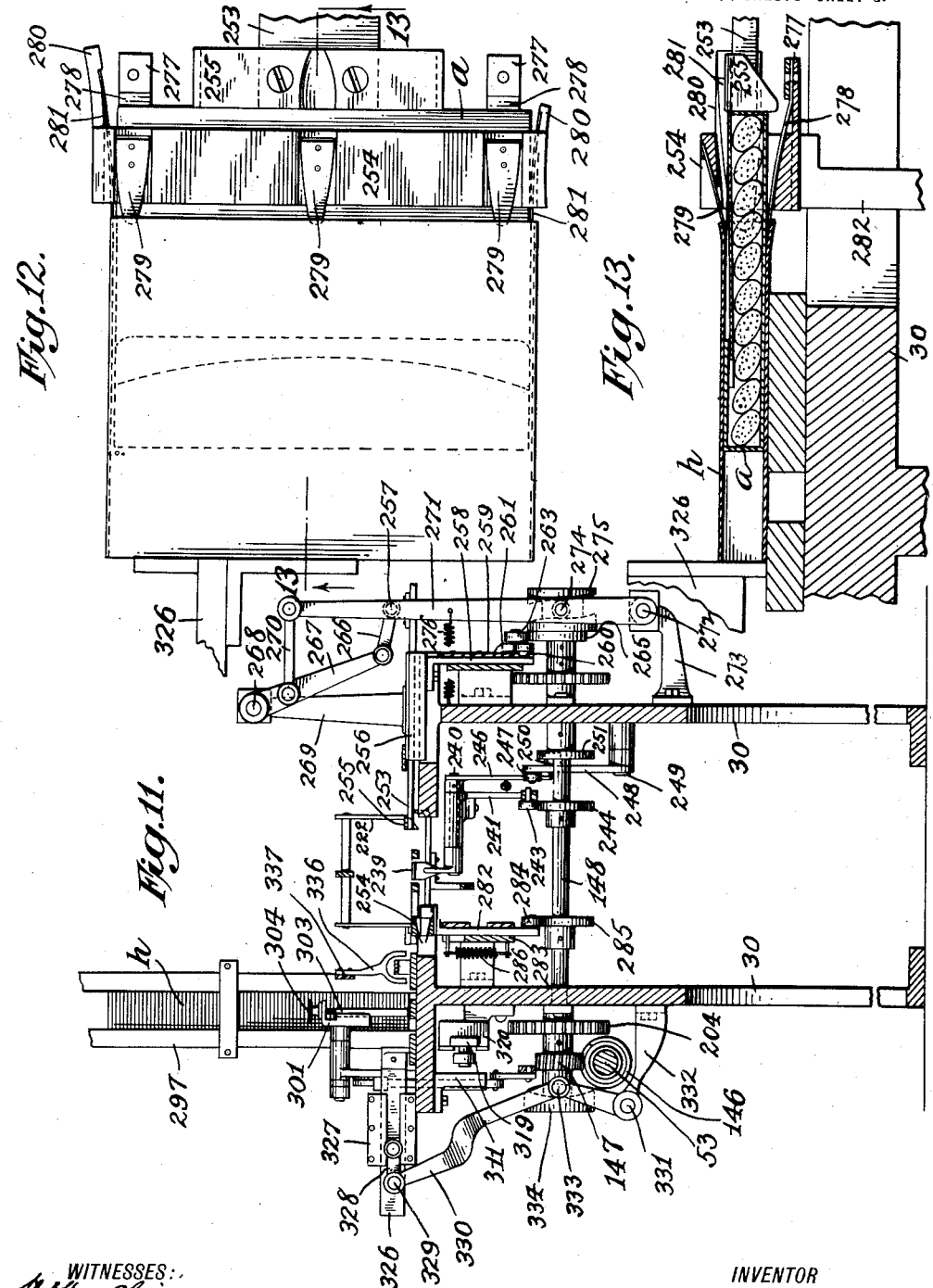

S. PALMOWSKI.
PACKING AND BOXING MACHINE.
APPLICATION FILED FEB. 14, 1920.

1,360,573.

Patented Nov. 30, 1920.
14 SHEETS—SHEET 9.

WITNESSES:

INVENTOR
Stanislaus Palmowski
BY
ATTORNEY.

S. PALMOWSKI.
PACKING AND BOXING MACHINE.
APPLICATION FILED FEB. 14, 1920.

1,360,573.

Patented Nov. 30, 1920.
14 SHEETS—SHEET 10.

WITNESSES:

INVENTOR
Stanislaus Palmowski
BY
ATTORNEY

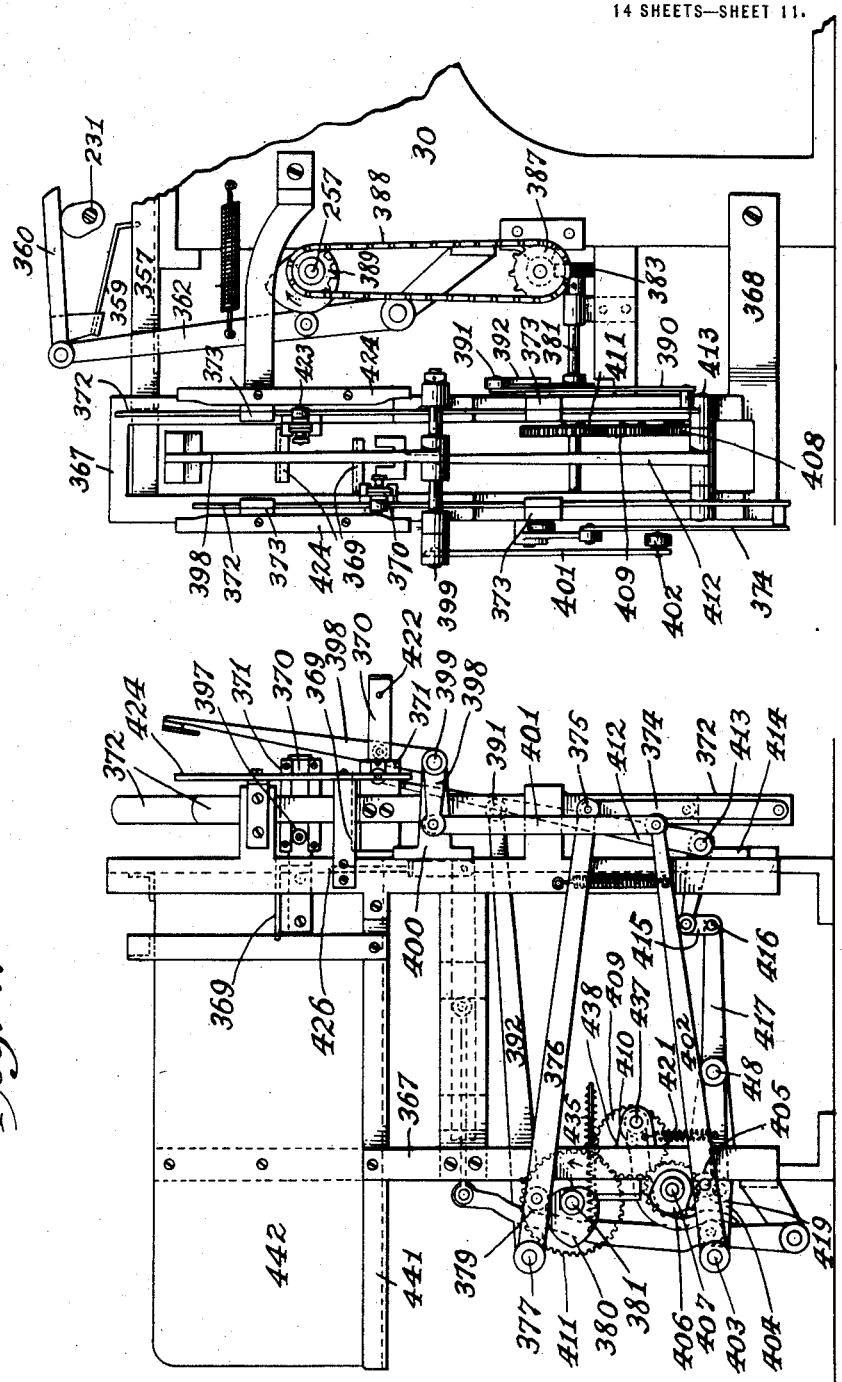

S. PALMOWSKI.
PACKING AND BOXING MACHINE.
APPLICATION FILED FEB. 14, 1920.
1,360,573.
Patented Nov. 30, 1920.
14 SHEETS—SHEET 12.
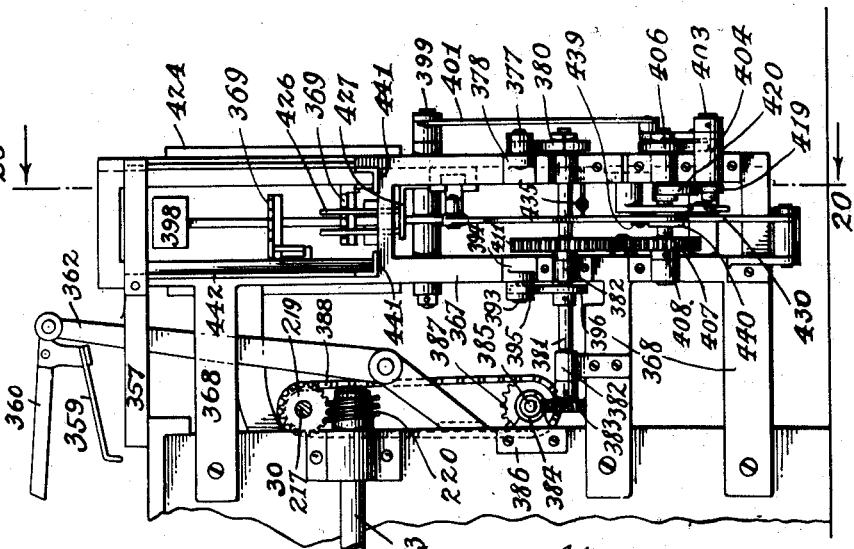

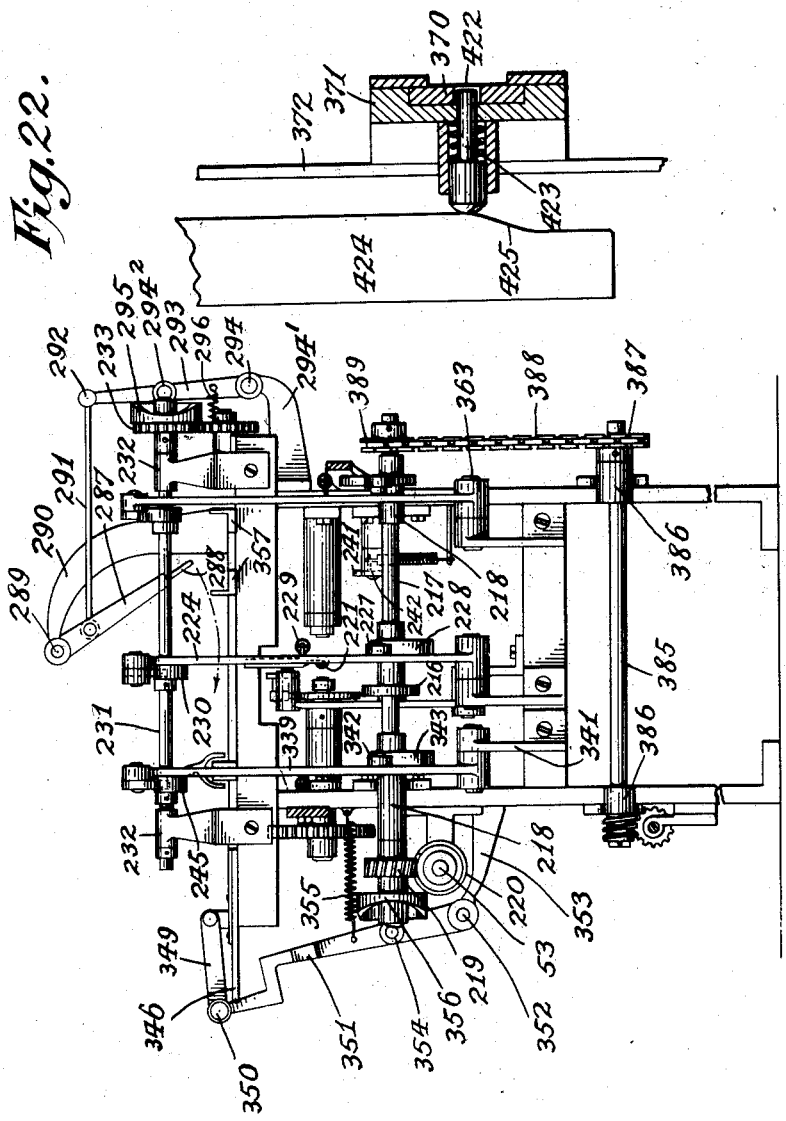

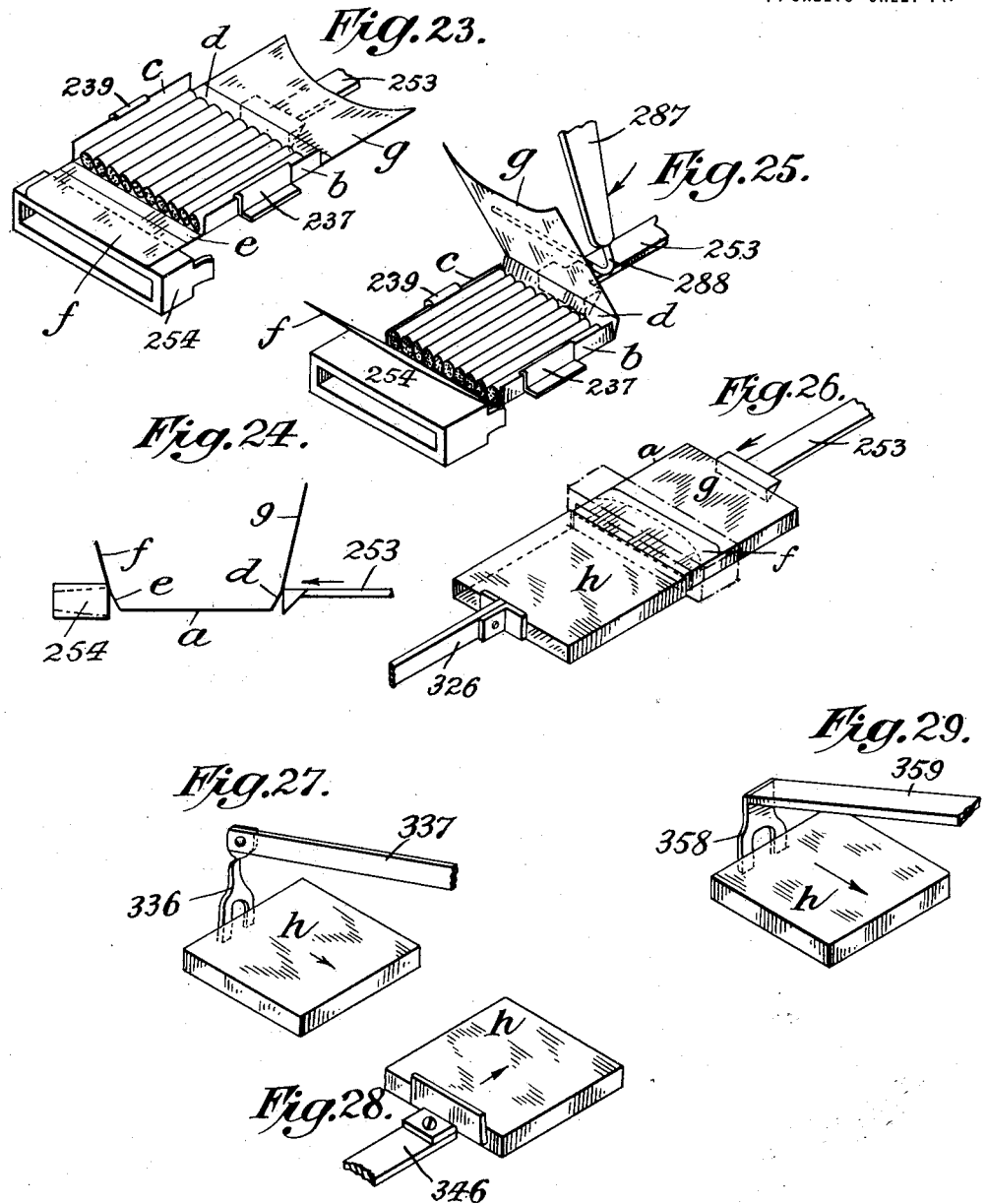

UNITED STATES PATENT OFFICE.

STANISLAUS PALMOWSKI, OF NEW YORK, N. Y.

PACKING AND BOXING MACHINE.

1,360,573.  Specification of Letters Patent.  Patented Nov. 30, 1920.

Application filed February 14, 1920. Serial No. 359,484.

*To all whom it may concern:*

Be it known that I, STANISLAUS PALMOWSKI, a citizen of Russia, residing at New York city, in the county of New York and State of New York, have invented certain new and useful Improvements in Packing and Boxing Machines, of which the following is a specification, reference being had therein to the accompanying drawing.

My invention relates to improvements in packing and boxing machines, and is particularly adapted for and illustrated in the accompanying drawings in its application to a machine adapted for packing, boxing and delivering cigarettes.

Figure 1:
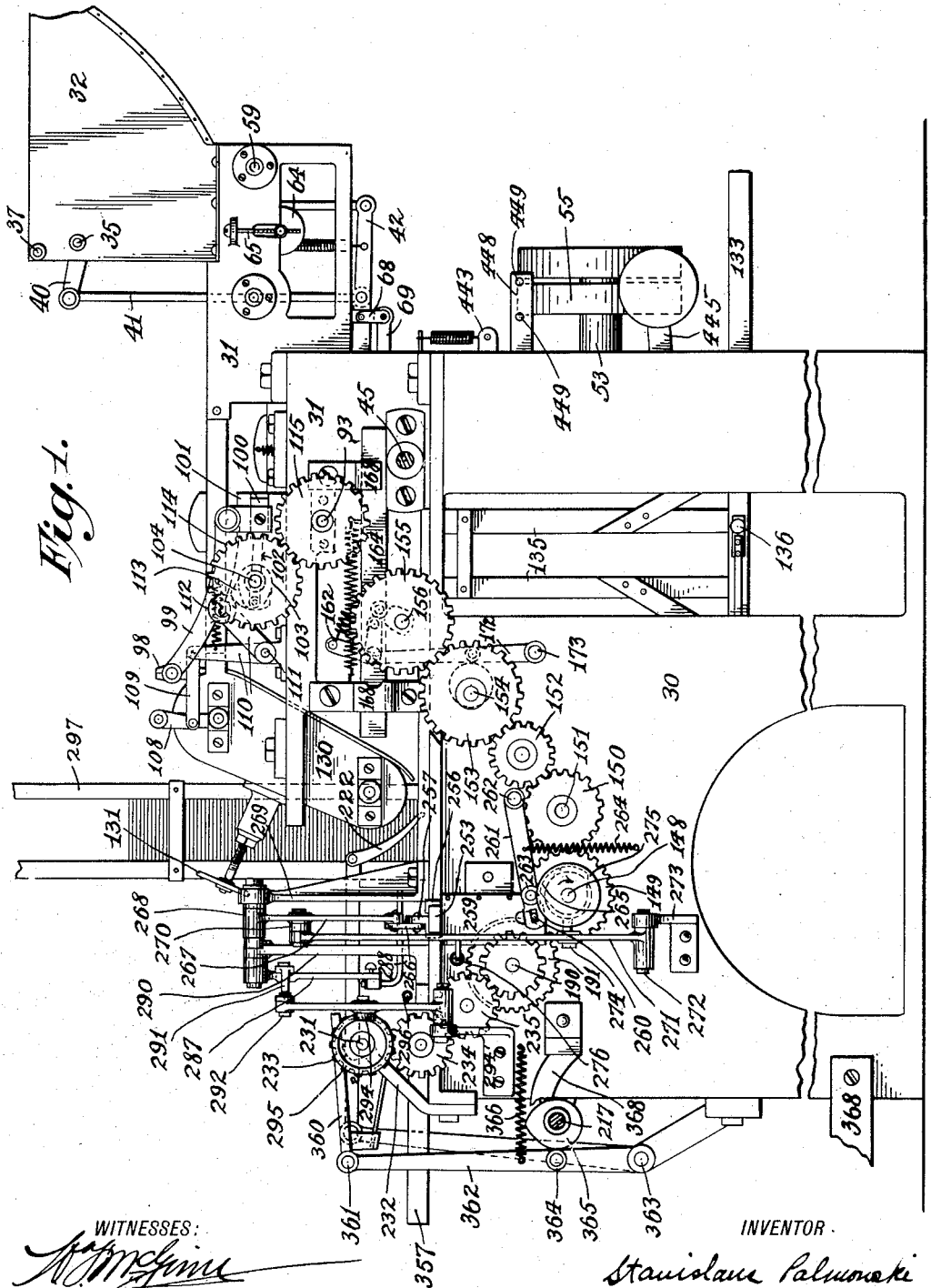
Figure 14:
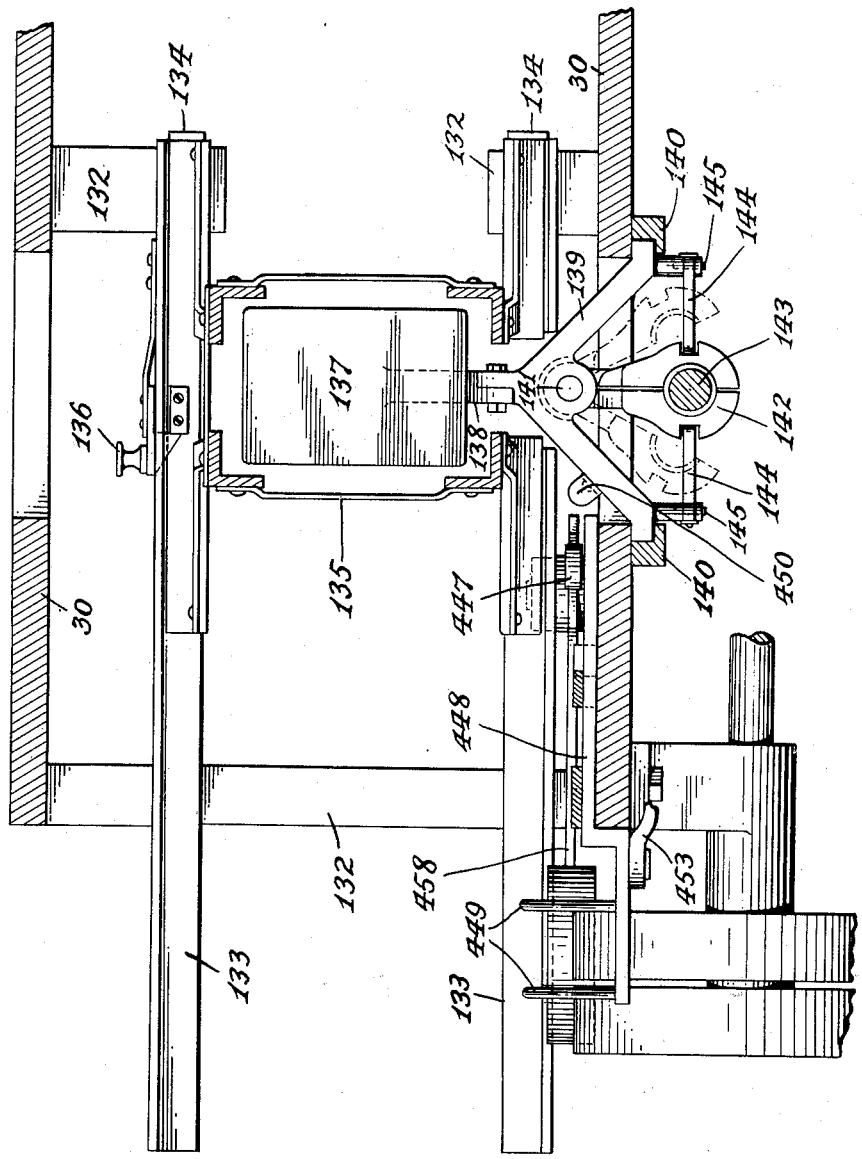
Figure 15:
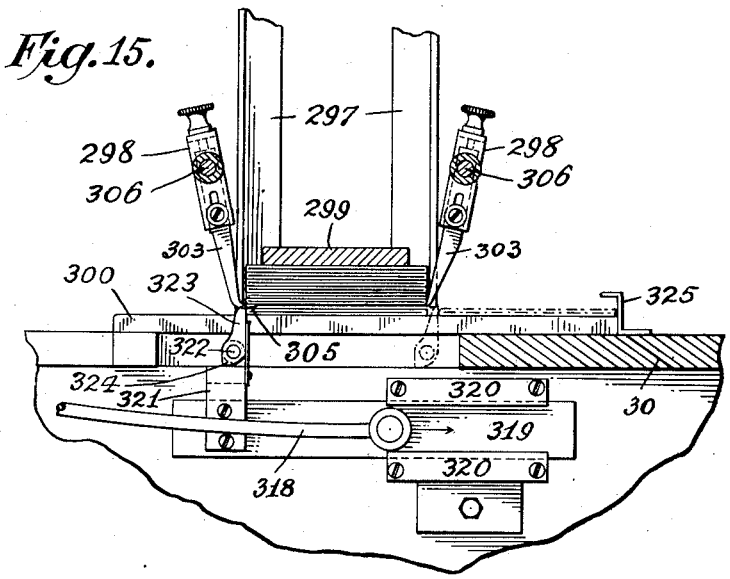
Figure 16:
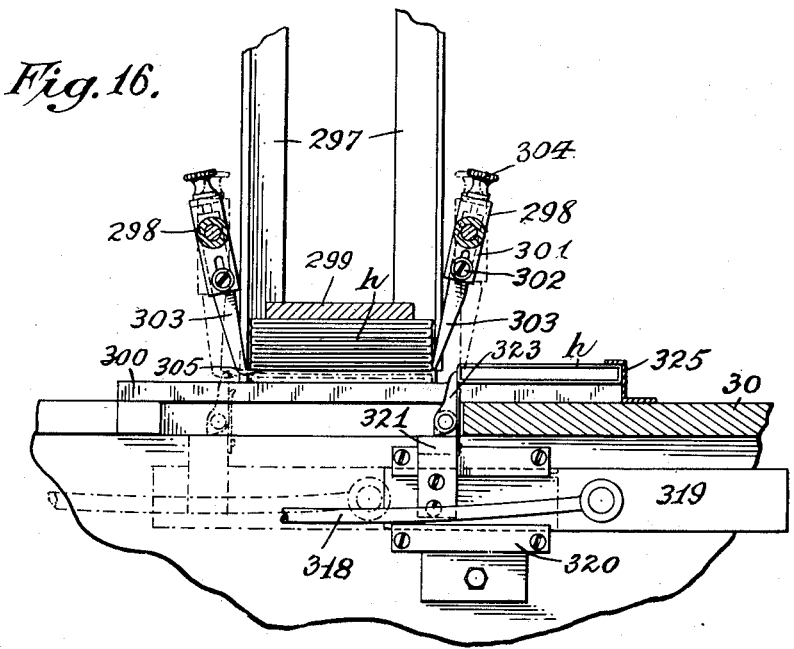

Referring to the accompanying drawings, Figure 1 is a side elevation, with parts broken away, illustrating a suitable form of machine showing an application of my invention looking from right to left at the same when facing the discharge side of the hopper, the delivery mechanism being omitted. Fig. 2 is a similar view looking from left to right. Fig. 3 is a top plan view of the complete machine. Fig. 4 is a longitudinal cross section of the machine looking at the same with the feeding hopper on the left and the delivery mechanism omitted. Figs. 5, 6 and 7 are enlarged details, partly in cross section, showing the feed mechanism for the cigarettes, said Fig. 5 being taken on the line 5—5 of Fig. 3. Figs. 8, 9 and 10 are sections in detail with parts broken away showing the box feeding and cigarette carrying devices, said Fig. 8 being a section on the line 8—8 of Fig. 2. Fig. 11 is a section on the line 11—11 of Fig. 3. Fig. 12 is a top plan in detail of the mechanism for inserting the inner portion of the box and cigarettes into the outside container. Fig. 13 is an enlarged section on the line 13—13 of Fig. 12. Fig. 14 is an enlarged section on the line 14—14 of Fig. 2 showing feed for the inner boxes on an enlarged scale. Figs. 15 and 16 are enlarged details, partly in cross section and partly broken away, showing the feed for the outside portions of the box. Fig. 17 is an end view of the delivery mechanism of the machine. Fig. 18 a right side elevation of the delivery mechanism. Fig. 19 a left side elevation of the delivery mechanism. Fig. 20 a section on the line 20—20 of Fig. 19. Fig. 21 a section on the line 21—21 of Fig. 3. Fig. 22 an enlarged detail partly broken away and partly in cross section, illustrating the lock on the delivery mechanism and Figs. 23 to 29 inclusive perspective and diagrammatic views showing the successive operations of packing the cigarettes and folding and delivering the boxes thereof.

Referring now more particularly to Figs. 1, 2 and 3, it will be observed that the main frame of the machine is indicated by the reference character 30. Upon this frame is mounted a second frame 31, to which is secured a feed hopper 32, having an inclined bottom which will tend to feed the cigarettes by gravity against a double-bladed shutter 33 which consists of a shorter blade 34, pivoted at 35 in the sides of the hopper 32, and a longer blade 36 pivoted at 37. The blades 34 and 36 are rocked on their pivots by the following means: to the pivot 37 is secured a arm 38 which is connected by a link 39 to a lever arm 40, the fulcrum of which is the pivot 35 to which the short blade 34 is secured. To the other end of the lever arm 40 is pivoted one end of a connecting rod 41, the other end of which is pivoted to a lever arm 42 which is mounted on a pivot 46 in the frame 31. The arm 42 has a roller 43 on an end which is engaged by a cam 44 mounted on a transverse shaft 45 which is mounted in the frame 31. The roller 43 is held in engagement with the cam 44 by a spring 47 attached between the arm 42 and the frame 31. The shaft 45 is revolved by the bevel gear 48 which meshes with a similar gear 49 on the upper end of the upright shaft 50, the lower end of which carries a bevel gear 51 which meshes with a similar bevel gear 52 mounted on the main drive shaft 53. The drive shaft 53 is journaled in suitable bearing 54 secured to the side of the frame 30, and has mounted on one end tight and loose pulleys such as 55. From this it will be seen that when the arm 42 is rocked by the cam 44, the shorter blades 34 and 36 will also rock on their pivots in such a manner as to push the cigarettes within the hopper back and allow only one cigarette at a time to pass beneath the shutter from the hopper onto the conveyer belt 56 which is mounted on rollers 57—58, the latter being the driven roller and secured to a shaft 59 on the end of which is mounted the ratchet wheel 60 adapted to be engaged by the pawl 61 pivoted to a rocking disk 62 which is also loosely mounted on the shaft 59. The conveyer belt 56 is moved intermittently by the ratchet wheel 60, and the pawl 61 mounted on the rocking disk 62 is rocked by a link 63 connected to the end of the arm 42 heretofore described. Means for regulating the tension of the conveyer 56 is provided by an idle roller 64 having a suitable screw adjustment 65.

The cigarettes are carried forward on the conveyer 56 and fall, one at a time, in the vertical reciprocating holder 66, shown to advantage in Fig. 5, which said holder is moved up and down in suitable ways 67 by a link 68 which connects the holder with one end of a rocker arm 69, pivoted in the frame 31 as at 70, and carry on its other end a roller 71 which engages the cam 72 on the shaft 45 as shown in Figs. 4 and 5.

The cigarettes are further conveyed along step by step by means of a conveyer which consists of two flat bars 73 having recesses 74 on their upper edges adapted to support the cigarettes therein. Said bars 73 are mounted in their links 75 which are adapted to rock on pinions 76 in a bar 77, secured to a vertical sliding member 78 hereinafter described. The center link 75 is spring held and has a downwardly projecting arm 79 having a roller 80 secured to the end and adapted to engage a cam 81 on the shaft 45. From this it will be seen that when the center arm 75 is rocked by the cam 81 engaging the roller 80, the carrying bars 73 will receive a horizontal reciprocation on the pivots 76. At the same time they will be vertically reciprocated by the sliding member 78 which has spring tension and is mounted in the ways 82 and has at its lower end a roller 83 adapted to engage a cam 84 mounted on the shaft 45. It will be seen that by this combination of movement that the bars 73 are given an elliptical movement which causes the ends of the bars to travel so as to bring the end recesses 74 under the cigarette on the holder 66 and lift it therefrom where it is conveyed to a recess 85 in a vertically reciprocating pair of bars 86 which are moved up and down as follows: The bars 86 are secured to brackets 87 which in turn are mounted on a horizontal bar 88 secured to a spring tensioned vertical sliding member 89 mounted in ways 90 and carrying at its lower end a roller 91 adapted to engage a cam 92 on a shaft 93 mounted in the frame 31. The shaft 93 is rotated by a gear 94 secured thereto and which is engaged by a gear 95 on the shaft 45, as shown in Figs. 2, 3, 4, 5, 6 and 7.

Referring to Fig. 4, it will be seen that the cigarettes are conveyed along step by step and deposited one at a time on a small platform 96 from which they are picked off and placed on a chain conveyer 97 by fingers 98 mounted on an arm 99 (see Fig. 1) which is pivoted to a horizontal reciprocating member 100 mounted in suitable ways 101 on the frame 31. The member 100 is reciprocated horizontally by a pitman 102 mounted on the face of a cam 103 which is carried by a stub shaft 104 mounted in suitable bearings on the frame 31. The edge of the cam 103 engages a roller 105 on the arm 99 which causes the said arm to rock on its pivot, and in combination with the horizontal movement just described, causes a rotary movement to the finger 98.

As a further means for assisting the cigarette to its position on the chain conveyer 97, a rocking device 106 is pivoted at 107 in a suitable bracket and has a depending arm 108 connected by a link 109 to one arm of a bell crank 110 pivoted at 111 upon a suitable bracket mounted on the frame 31. The other arm of the bell crank lever carries a roller 112 adapted to be engaged by a cam 113 on the stub shaft 104 which is vibrated (see Figs. 1 and 3) as follows: On the stub shaft 104 is mounted a gear 114 which meshes with the gear 115 mounted on the right end of the shaft 93 which receives its motion as heretofore described.

The cigarette having been deposited on the chain conveyer 97, it is conveyed downwardly and is laid in position upon the interior portion of one of the boxes within which it is to be packed. The conveyer 97 consists of two sprocket chains spaced apart at a distance substantially the width of a cigarette. They are mounted on a pair of sprockets 116 at the bottom and pass over a pair of drivers 117 at the top. The latter are secured to a shaft 118 which carries a gear 119 which meshes with the pinion 120 on a stub shaft 121. This stub shaft carries a sprocket 122 which receives its motion from sprocket chains 124 which runs over a driven sprocket wheel 125 mounted on a shaft 93. An adjustable idler 126 is provided to give suitable tension to the chain 124. Means are provided for adjusting the tension of the chain conveyers 97 by the idler sprocket 127 which is mounted in the sliding frame 128 which is in turn moved on a screw rod 129 mounted in the conveyer frame 130, and this screw rod is provided with a hand wheel 131.

Thus far the cigarette has progressed to a point where it meets and is placed upon the blank or inside portion of the box at which point the same will be left for the time being. Referring now to the lower part of the frame 30, it will be observed that two cross arms 132 support angle irons such as 133 having their inner ends turned up as at 134 to form an abutment for a rectangular frame such as 135 which is adapted to be filled with the inner side portions or blanks of the boxes and which slides into position on the ways 133 and locks in said position by a spring latch 136 (see Figs. 1, 2, 4 and 14). An elevator 137 is introduced beneath the pile of blanks or inner portions and the same are fed upwardly. This elevator consists of a flat plate upon which the blanks rest. It is provided with an arm 138 which is secured to the double armed member 139 which is adapted to slide vertically in slideways 140. On a pivot 141 in the two armed member 139 is hinged a split nut 142 adapted to engage a screw shaft 143 which is revolved by means hereinafter described. The split nut 142 is held in engagement with the screw shaft 143 by a pair of spring pressed locking arms 144 pivoted at 145 on the member 139, the purpose of the device being to raise or lower the platform manually without rotating the shaft.

Means for rotating the screw shaft 143 (referring to Fig. 2) comprise the main drive shaft 53 which has mounted thereon a worm gear 146 which meshes with gears 147 on a transverse shaft 148 which extends through the opposite side of the machine and on which end of said shaft 148 there is mounted a gear 149 (see Fig. 1) which meshes with a gear 150 on the shaft 151. The gear 150 meshes with an idler 152 which in turn meshes with the gear 153 on the shaft 154. The gear 153 meshes with the gear 155 on the end of the shaft 156, which extends through the opposite side of the machine (see Figs. 2 and 8) and has mounted thereon an eccentric 157 which is connected to a slide block 158 to which is pivoted a spring pressed pawl 159 which engages a ratchet wheel 160 on the top of the screw shaft 143. From this it will be seen that as the eccentric arm 157 reciprocates, the block 158 causes the pawl 159 to intermittently engage the ratchet wheel 160 on the top of the shaft 143, and thus revolve intermittently the said shaft 143. The blanks or inside portions of the boxes are fed upwardly by the screw shaft 143 and the top blank or inner portion of the box is engaged by the two rubber tipped fingers 161. The rubber tipped finger 161 is mounted on one end of a bell crank lever 162 which is pivoted at 163 to a reciprocating bar 164. One arm of the bell crank carries a roller 167 which is held against a cam 165 on the shaft 156 by a spring 166 secured between the upper arm of the bell crank 162 and bar 164. A reciprocating bar 164 is mounted in slideways 168 and is reciprocated by the action of the cam 169 on the shaft 154 against the tension of the spring 170 secured to the bar 164 and the frame 31. The transmission is effected by cam 169 engaging a roller 171 on the arm 172 which is pivoted at 173 upon the frame 30. The other end of the arm 172 is connected by a link 173ª to the bar 164. From this it will be obvious that the rubber tipped fingers 161 move in what is substantially a rectangular path and when on the lower side of the path they press against the blanks or inner portions of the boxes in such a manner as to grip the top one and move it forward to a position between the roller 174 on the shaft 156 and roller 175 mounted on stud 176 secured to an arm 178 pivoted on shaft 151 in the frame 30 and adapted to be rocked on its pivot 151 by a cam 180 on the shaft 154 against the tension of the spring 181 secured between the other end of the arm 178 and the frame 30. (See Figs. 4 and 9.)

Referring now to Figs. 4, 8, 9 and 10, it will be observed that after a blank has passed through the rollers its edges slip into guides 252 secured on the top of the frame 30 where the center of the blank is supported on a pair of rails 182. This position of the blank is shown on the right end of Fig. 10. The rear edge of the blank is then engaged by a pair of fingers 183, the alternate position of which is shown in dotted outline. The finger 183 then moves the blank forward until the blank is in a position under the chain conveyer and as shown in Fig. 9, has one cigarette deposited thereon. The fingers 183 move in a rectangular path and means for so moving them are shown to better advantage in Figs. 4 and 8 in which it will be observed that the fingers 183 are secured to the arm 184 which in turn is secured to a horizontal reciprocating bar 185 mounted in ways 186 secured to a vertical reciprocating member 187 hereinafter described. The bar 185 is reciprocated by means of a pitman 188 connected to a crank 189 on the end of a shaft 190 which projects through the frame on the right side of the machine (see Fig. 1) and carries a gear 191 which meshes with the gear 149 on the shaft 148 from which it receives its power. The vertical reciprocating member 187 is mounted in ways 192 and carries a roller 193 which bears against a cam 194 on the shaft 151. When the blank has been pushed forward by the fingers 183 to a position as shown in Fig. 9, the rear edge of the blank is engaged by a second set of fingers 195 which also move in a rectangular path. The fingers 195 are secured to an upright arm 196 which in turn is secured to a horizontal reciprocating bar 197 mounted in ways 198 which in turn are secured to a vertical reciprocating member 199 slidably mounted in the ways 207 hereinafter described. The bar 197 is reciprocated by means of a connecting rod 200, one end of which is secured to the bar 197 and the other end to the face of the cam 201 on the shaft 202 which projects through the frame 30 on the left side of the machine and has secured thereto a gear 203 which meshes with a gear 204 on the shaft 148 (see Fig. 2).

Referring again to Fig. 9, the vertical reciprocating bar 199 is under spring tension and carries a roller 205 thereon which is engaged by a cam 206 on the shaft 151. A third set of fingers 208 which move in substantially a rectangular path next engage the rear edge of the blank and move it along from a position shown in Fig. 10 to the position of the blank holding ten cigarettes shown in Fig. 9. The fingers 208 are secured to an arm 209 (see Figs. 4 and 9) which carries a roller 210 which rests on the cam 201 on the stub shaft 202. The end of the arm 209 is pivoted at 211 to an upright arm 212 which is pivoted at 213 to a bracket 214 mounted on the frame 30. The arm 212 has a roller 215 mounted thereon which is engaged by a cam 216 mounted on a shaft 217. The shaft 217 is mounted in suitable bearings 218 (see Fig. 21) on the front end of the frame 30. On the left end of the shaft 217 and secured thereto is a worm gear 219 which meshes with the worm 220 mounted on the end of the drive shaft 53. It is evident that when the cam 216 is rotated on the shaft 217, by the means described, the cam will bear against the roller 215 on the arm 212 causing it to rock on its pivot 213 and push the arm 219 and the fingers 208 rearwardly against the tension of a spring 221, at the same time the action of the cam 201 against the roller 210 on the arm 209 raises and lowers the arm 209 and thus it gets the rectangular motion just described. The blank now being filled with cigarettes as shown in Fig. 9, is next engaged by a pair of fingers 222 and pushed forward into a position shown in Fig. 10. Means for moving the fingers 222 are shown to advantage in Fig. 4. The fingers 222 are secured to an arm 223 which is pivoted to an arm 224, the other end of which is mounted on a pivot 225 in the bracket 226 secured to the frame 30. The arm 224 carries a roller 227 adapted to be engaged by a cam 228 on the shaft 217. A spring 229 attached to the arm 224 serves to hold the roller against the cam 228. Thus the arm 224 will rock on the pivot 225 and at the same time transmit to the finger 222 a horizontal motion and at the back stroke will be raised out of engagement with the blank by means of a cam 230 on a shaft 231 upon which rests the arm 223, so timed as to raise the arm 223 when the same is moving toward the rear. The shaft 231 is journaled in suitable bearings 232 secured to the frame 30. On the right end of said shaft there is secured a gear 233 which meshes with a pair of idlers 234 and 235 mounted on the frame 30. The idler 235 meshes with the gear 236 on the shaft 190 which is revolved by a train of gears heretofore described.

The blanks or inner portions of the boxes have front and rear flaps $b$ and $c$ adapted to be turned up. The front flap $b$ engages a plate 237 having a turned edge 238 in such a manner as to turn up the edge $b$ (Fig. 10) at the same time the rear edge $c$ of the blank is engaged by the finger 239 which is mounted on a pivot 240. The movement of the finger 239 is shown in Fig. 10 where the dotted position shows the normal position, the working position being shown in full lines. While this movement is taking place, the finger rocks back on its pivot 240 so as to get under the flap $c$ and then moves upward and forward in such a manner as to fold the flap $c$ perpendicular to the blank or inner portion.

The finger 239 is mounted on the pivot 240, the latter being carried in one end of an arm 241 (see Fig. 4) which is pivoted to a stub shaft 242 on the left inside of the frame 30. The arm 241 carries a roller 243 which engages a cam 244 on the shaft 148 being held against said cam by a spring 245. The pivot 240 has secured thereto a depending arm 246 which is spring retained against a roller 247 on the end of an arm 248 pivoted at 249 and having a roller 250 which engages a cam 251 on the shaft 248 (see Figs. 4 and 11).

By this arrangement it will be seen that the finger 239 will be raised and lowered and at the same time receive a rocking motion on its pivot 240. The appearance of the blank and cigarettes up to this point is clearly shown in diagram in Fig. 23.

Referring to Fig. 8 it will be noted that the blank is secured on its surface so as to provide a folding means for the flaps $b$ and $c$ and also for similar flaps $d$ and $e$ which form the ends of the box and the flaps $f$ and $g$ which when folded form the top of the box. The flaps $d$ and $e$ are now folded up to form the ends of the box and then the flaps $f$ and $g$ are folded over so as to completely envelop the cigarettes (see Figs. 24 and 25).

The blank now rests upon the rails 182 at their forward ends and the flaps $b$ and $c$ are held upright between the plate 237 and the finger 239 while the flaps $g$ and $e$ have passed from under the guides 252 and now rest between the pusher bar 253 and an open sided box like member 254 (see Figs. 23 to 25 inc.) The pusher bar 253 has a vertical and also a horizontal motion, the vertical motion taking place first so as to turn up the flap $d$ and the flap $g$ and then a horizontal thrust in order to push the package along at right angles to the rail 182. The pusher arm 253 consists of a flat bar having secured at its inner end and at right angles thereto a plate 255 adapted to push against the package. Referring to Figs. 1, 3, 8 and 11, it is mounted in a horizontal slideway 256 and has at its outer end a lug 257. The slideway 256 is mounted on a vertical reciprocating bracket 258 mounted in a slideway 259 secured to the frame 30. The bracket carries a pin 260 on its lower end which projects into a slot in the end of the arm 261 which is pivoted at 262 to the frame 30 (Figs. 1 and 11.) The arm 261 is provided with a roller 263 which is held by the spring 264 against the cams 265 mounted on the shaft 148. From this it will be seen that the bracket 258, the slideway 256, and the pusher bar 253 will move up and down by the action of the cam 265 and thus turn up the flap $d$ and the flap $g$ of the blank, as shown in Fig. 24. The horizontal movement of the pusher bar is provided for by the lug 257 connected by a link 266 to the end of the swinging arm 267 mounted on a pivot 268 in the end of an upright bracket 269. The arm 267 is further connected by a link 270 to the end of an arm 271 mounted on a pivot 272 in the end of a bracket 273 secured to the frame 30. The arm 271 carries a roller 274 which engages a slotted cam 275 and is held in engagement therewith by a spring 276. While the flap $d$ and the flap $g$ are being folded upwardly by the vertical motion of the pusher arm 253, a similar motion is being given to the flap $e$ and the flap $f$ the latter being on the top of the box like member 254 (see Figs. 23 to 25 inc.) This box like member 254 is in the form of an oblong box having two open sides (see Figs. 11 to 13 inc.) on the long side thereof. The upper and lower inside surfaces are tapered and on the lower side are three lugs 277 on which are mounted leaf springs 278 which taper toward the longitudinal center of the box. The upper outside surface of the box has three recesses therein in which are mounted leaf springs 279 which also taper toward the longitudinal center of the box. The ends of the box are extended on the inner or righthand side to form lugs 280 on which are mounted leaf springs 281 which taper inwardly beyond the plane of the sides $b$ and $c$ of the folded package. The box 254 is mounted on a vertical reciprocating bracket 282, mounted in slideways 283 and it carries at its lower end a roller 284 which presses on a cam 285 against the tension of a spring 286. The cam 285 is mounted on the shaft 148. It is obvious from the foregoing that the box 254 will be raised through the medium of the cam 285 at the proper time and the flap $e$ and the flap $f$ will be folded upwardly as shown in Fig. 24. At this instant the pusher arm 253 begins to push the package forward and the flap $f$ engaging the upper edge of the box 254 begins to fold over, and the package moves into the box 254. At the same time an arm 287 carrying a finger 288 bent at right angles thereto engages the raised flap $g$ and with a relatively quick movement folds the flap $g$ down in advance of the flap $f$.

Referring to Figs. 1 and 21, the arm 287 is mounted in a pivot 289 on the bracket 290 which is secured to the top of the frame 30. The arm 287 is connected by a link 291 to a pivot 292 on the end of an arm 293 which is pivoted to a bracket at 194' and secured to the side of the frame 30. The arm 293 carries a roller 294 which bears against a cam 295 on the shaft 231 against the tension of a spring 296. The pusher arm then continues to push the package formed by the blank in and through the box like member 254 where it is met by an enveloping container coming from the opposite direction, the top, bottom and sides being held open by the leaf springs 279, 278, and 281, the springs being pressed open by the incoming package (see Figs. 12, 13 and 26.)

Referring to Figs. 2, 3, 8, 11, 15 and 16, the containers are deposited flat in a hopper 297 made of four angle irons mounted in an upright position on the top of the frame 30. The bottom is supported by a pair of supporters 298 hereinafter described. In order to keep the pile of containers in a flat condition a weight 299 is placed on top of the pile. The bottom container is let down on a rail 300 mounted on the top of the frame 30 while the rest of the pile of containers are held up by the supporters 298 and means are provided to push the bottom container out from under the pile where it is opened to a shape suitable to envelop the package and then it is pushed forward to the point where it envelops the package.

The supporters 298 are located in the front and rear of the hopper 297. They consist of a piece 301 to which is secured in adjustable relation by a screw 302, a depending arm 303, which is further held in the piece 301 by an adjusting thumb screw 304 on the top of the piece 301. The arm 303 on the front tapers to a point while the arm on the rear supporter is provided with a toe 305. The pieces 303 are secured to rock shafts 306 journaled in bracket bearings 307 mounted on top of frame 30. Secured to the rock shafts 304 are arms 308 which are connected by link 309 to a vertical reciprocating bar 310 mounted in a slideway 311 and connected by a link 312 to spring pulled arm 313 pivoted to the frame 30 at 314 and carrying a roller 315 which engages a cam 316 mounted on the end of the shaft 151 (see Figs. 2 and 11).

Referring to Figs. 2, 8, 15 and 16, on the end of the shaft 154 is mounted a crank arm 317 which is connected by a connecting rod 318 to a horizontal reciprocating bar 319 mounted in ways 320. To one end of the bar 319 is secured a block 321 on the top of which is pivoted at 322 a spring pressed pawl 323 having a toe 324 which swings forward from the perpendicular but not rearward. In Fig. 15 the pawl 323 is in its rearmost position just starting forward while the supporters 298 are rocked in on their shafts 306 and are holding up the pile of containers. A flat container is shown at the bottom of the pile ready to be pushed out by the pawl 323. As the bar 319 is moved forward it carries the pawl 323 with it and pushes the bottom containers out from under the pile to a position shown in dotted lines and almost to the end of the stroke of the bar 319. The container is still flat but its front end has butted against a plate 325 secured to the frame 30.

Referring to Fig. 16, the position here shown is at the end of the stroke of the bar 319 which has caused the container to open up into the position shown by the pressure of the pawl 323 on one side and the plate 325 on the other. The bar 319 then moves back and as the pawl passes under the pile, the supporters 298 are then rocked on their shafts 306 letting the container rest on the pawl 323 which rocks on its pivot 322 against the leaf spring. When the pawl 323 has passed from under the pile, the bottom container is then resting on the rail 300 and the positions are then as shown in dotted lines in Fig. 16. The instant the pawl 323 starts forward again, the supporters 298 rock in and hold the pile again. The open container is now engaged by a pusher bar 326 and pushes the container into position to receive the package as shown in Fig. 13. The bar 326 is mounted in slideways 327 on the top of the frame 30 (see Figs. 2, 3 and 11). Pivoted to the bar 326 is a link 328 the other end of which is pivoted at 329 to the end of a lever 330 which in turn is pivoted at 331 to a bracket 332 secured to the side of the frame 30. The lever 330 carries a roller 333 which bears on a cam 334 mounted on the shaft 148. A spring 335 on the bar 326 serves to keep the roller 333 against the cam 334.

The container having enveloped the folded blank, it is in position to be moved forward and it is engaged by a fork-shaped piece 336 attached to the end of an arm 337 pivoted at 338 to the end of an arm 339, the other end of which is mounted on a pivot 340 in a bracket 341. The arm 339 carries a roller 342 which engages a cam 343 on the shaft 217. A spring holds the arm 339 under tension. The arm 337 rests on a cam 345 on the shaft 231 and this cam is so timed as to raise the bar 337 on the return stroke so as to drop the fork 336 in the rear of the container. The arm 337 and its attending mechanism draws the container forward and deposits it in line with another pusher bar 346 which pushes the containers across the machine from left to right on flat rails 347. This bar 346 is slidably mounted in ways 348 and is connected by a link 349 to a pivot 350 on the end of an arm 351 which is mounted on a pivot 352 on a bracket 353 secured to the frame 30. The arm 351 carries a roller 354 and a spring 355 which keeps the roller 354 against a cam 356 on the shaft 217. The last two operations are shown in diagram in Figs. 27 and 28.

The container is intermittently pushed along the rails 347 until it is in a position opposite the end of a pair of angle irons 357 which form a track for the delivery of the containers to a piling and counting device hereinafter described. The containers are here engaged by a forked member 358 attached to a bar 359 which is secured to an arm 360 pivoted at 361 to an arm 362 which is mounted on a pivot 363 and carries a roller which is held against a cam on the shaft 217 by a spring. The arm rests on a cam on the shaft 231. The movement of the fork 358 is such that it engages the container and draws it forward to the end of the stroke, the fork 358 then raises and passes back above the container and finally drops behind another container ready to bring it forward on the next stroke.

The delivery mechanism is mounted on a frame work 367 which has extending arms 368 adapted to be bolted to the frame 30 and thus support the frame 367. The delivery mechanism consists of means for collecting a pile of twenty containers which are lowered on a descending platform and pushed to the left into a delivery table which has a capacity of five piles of containers each pile having twenty containers therein. The containers are fed along the track 357 by means described where they drop on to one of a pair of platforms 369. The platforms 369 are mounted on horizontal reciprocating bars 370 which in turn are mounted in slide ways 271 which are secured to vertical reciprocating bars 372 which are slidably mounted in ways 373 in the frame 372. The bars 367 and their platforms are located on the right side of the machine one being in front and the other in the rear. The front bar 372 is connected by a link 374 to a pivot 375 on the end of an arm 376 which is pivoted at 377 to a bracket bearing 378 on the frame 367. The arm 376 carries a roller 379 which rests on a cam 380 mounted on a shaft 381. The shaft 381 is a drive shaft mounted in suitable bearing 382 on the frame 367. It has pinned to its rear end a worm gear 383 which meshes with another worm 384 on the end of a transverse shaft 385 mounted in bearings 386 secured to the main frame 30.

On the opposite end of the shaft 385 is mounted a sprocket 387 which is connected by a chain 388 to a similar sprocket 389 mounted on the end of the shaft 217 heretofore described. The rear platform 369 and bar 372 are raised and lowered in a similar manner by a link 390 one end of which is pivoted to the rear bar 372 and the other end to a pivot 391 on the end of an arm 392 which is mounted on a pivot 393 in a bracket 394 on the frame 367. The arm 392 carries a roller 395 which rests on a cam 396 secured to the drive shaft 381. It is evident from the foregoing that the platform will be raised and lowered alternately. Means are provided for moving the ascending platform 369 horizontally into the path of the containers when the said platform is at the top, the descending platform having reached the bottom with a pile of twenty containers thereon. The bars 370 carry rollers 397 which are engaged by a member 398 in the form of a bell crank lever mounted on a pivot 399 in a bracket 400 secured to the frame 367. The lower arm of the bell crank 398 is connected by a link 401 to one end of an arm 402 pivoted at 403 to a bracket 404. The arm 402 carries a roller 405 which engages a cam 406 mounted on a shaft 407 journaled in suitable bearings on the frame 367. The shaft 407 carries a gear 408 which meshes with an idler 409 on the stub shaft 410. The idler meshes with a gear 411 on the drive shaft 381.

Similar means are provided for moving the descending platform out from under the pile of containers. The roller 397 on the horizontal reciprocating bar 370 is engaged by the end of an arm 412 in the form of a bell crank lever which is pivoted at 413 to a bracket 414. The lower arm of the bell crank is connected by a link 415 pivoted at 416 to one end of an arm 417 which is pivoted at 418 to a suitable bracket. The other end of the arm carries a roller 419 which engages a cam 420 on the shaft 407 against the tension of the spring 421.

Referring to Figs. 17, 18 and 22, the reciprocating bars 370 have a pair of holes 422 in their sides which are engaged by spring pressed pins 423 mounted on the ways 371. The holes 422 are so located on the bars 370 which correspond to the outer and inner positions of the platform. The pins 423 are held in engagement in the holes 422 by the pins 423 being pressed against a strip 424 having cam surfaces 425 at each end in such a manner that when the pins 423 reach these surfaces they are allowed to move outward of engagement with the holes 422.

When the descending platform 369 reaches the bottom there are piled up on it twenty containers which are engaged by a pair of fingers 426 which protrude through suitable slots in the platforms 369.

The fingers are mounted on a piece 427 which is mounted on a horizontal reciprocating bar 428 slidably mounted in ways 429. The bar 428 is connected to the end of an arm 430 by a link 431. The arm 430 is mounted on a pivot 432 in the bracket 433. It carries a roller 434 which is pressed by the spring 435 against arm 436 mounted on a pivot 437 in the bracket 438 on the frame. The arm 436 carries a roller 439 which engages a cam 440 mounted on the shaft 407. From the mechanism just described it is evident that the fingers 426 will push the pile off the descending platform and on to a pair of rails 441 mounted on the frame 367. One of the rails has an upright partition 442 which acts as guides to the pile of containers on the rails 441.

Returning to the main machine, means are provided to automatically stop the machine when the supply of blanks have been exhausted. It consists of spring lever 443 mounted on a pivot 444 on the inside of the frame 30. The inner end is shaped to form a tooth which is engaged by a weighted bell crank lever 445 pivoted to the frame at 446. The upper arm of the bell crank presses against a roller 447 (see Figs. 2 and 14) on a horizontal sliding bar 448 which carries a pair of pins 449 which engage the power belt. On the two-armed member 139 which carries the elevator 137, is mounted a right angled lug 450 which when in the topmost position of the elevator 137 engages the end of the arm 443 and raises it on a pivot 444 thus releasing the weighted bell crank which falls against the roller 447 on the bar 448 and pushes the latter over in such a manner that the power belt is slipped over the loose pulley thus stopping the machine. Manual means are also provided for stopping the machine by providing a hand lever 451 which is pivoted at 452 and connected by a link 453 to the bar 448 which engages the power belt.

Of course it will be understood that various modifications may be made without departing from the spirit of the invention as claimed.

I claim:

1. In a machine of the class described, means for delivering cigarettes continuous one at a time upon a belt, means for continuously passing said cigarettes one at a time from said belt and continuously depositing the same upon a carrier, and means for transferring said cigarettes successively from said carrier in position upon a blank which is thereupon formed into a box.

2. In a machine of the class described, means for delivering cigarettes continuously one at a time upon a belt, means for continuously passing said cigarettes one at a time from said belt and continuously depositing the same upon a carrier, and means for transferring said cigarettes successively from said carrier in position upon a blank which is thereupon formed into a box, said last mentioned means comprising an endless conveyer and a finger, said finger adapted to pass said cigarettes from said carrier to said conveyer.

3. In a machine of the class described, means for feeding articles one at a time in position upon the inside blank of a box, means for shifting and folding said box, and means for introducing the outer portion of said box in position and pushing the formed blank containing said articles within said outside portion.

4. In a machine of the class described, means for successively feeding the inside blanks of boxes into position, means for one at a time feeding cigarettes in position upon said blank, means for forming said inside blank, means for advancing the same and simultaneously therewith means for opening and placing in position the outer portion of the box within which said blank is subsequently introduced.

5. In a machine of the class described, means for successively feeding the inside blanks of boxes into position, means for one at a time feeding cigarettes in position upon said blank, means for forming said inside blank, means for advancing the same and simultaneously therewith means for opening and placing in position the outer portion of the box within which said blank is subsequently introduced, and means for automatically discharging said boxed cigarettes in stacks of predetermined quantities.

In testimony whereof I hereunto affix my signature.

STANISLAUS PALMOWSKI.